March 2, 1971    D. HOFFMEISTER ET AL    3,567,549

METHOD OF PRODUCING A FIBER-OPTICS IMAGE-TRANSMITTING DEVICE

Filed Nov. 28, 1967    3 Sheets-Sheet 1

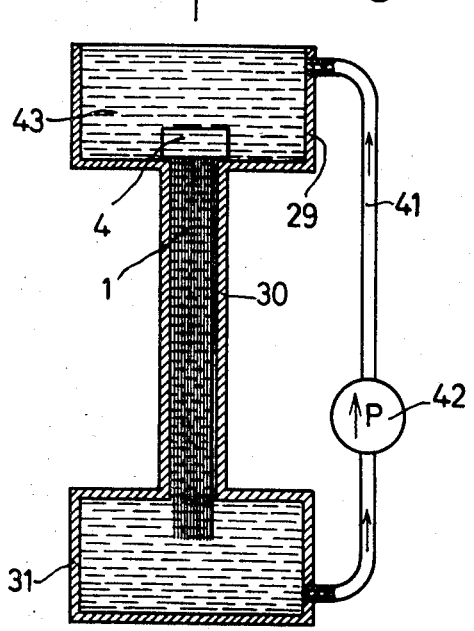
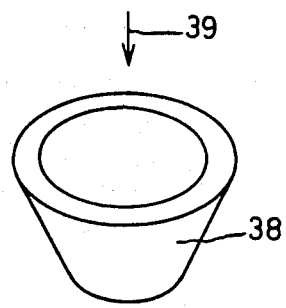
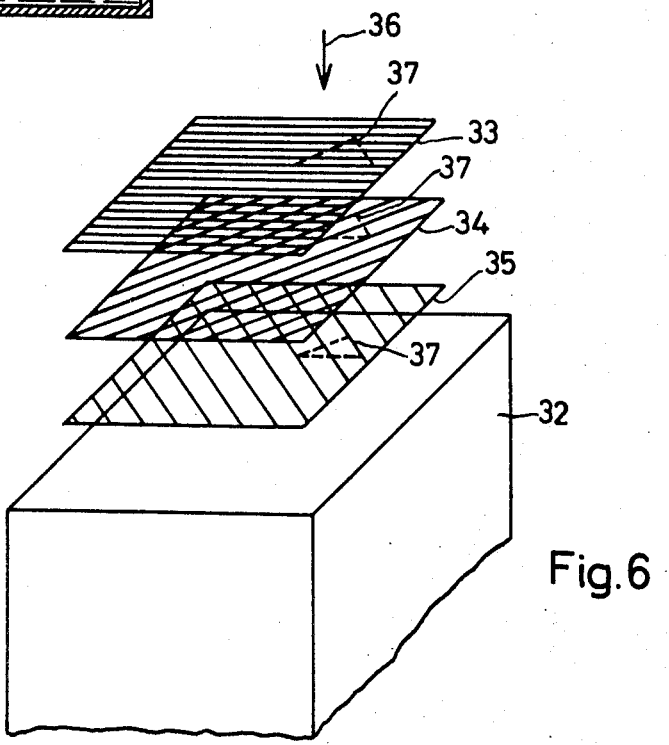

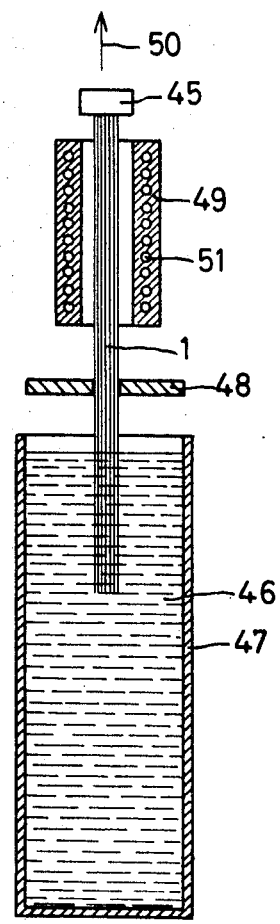
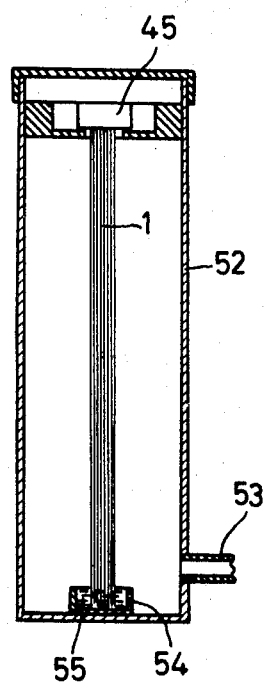
Fig.8
Fig.9

3,567,549
METHOD OF PRODUCING A FIBER-OPTICS
IMAGE-TRANSMITTING DEVICE
Dietrich Hoffmeister, Oberkochen, Josef Ladel, Konigsbronn, and Fritz Schleich, Wasseralfingen, Germany, assignors to Carl Zeiss-Stiftung, doing business as Carl Zeiss, Heidenheim (Brenz), Wurttemberg, Germany
Filed Nov. 28, 1967, Ser. No. 686,264
Claims priority, application Germany, Dec. 1, 1966,
Z 12,561, Z 12,562
Int. Cl. B32b 17/00
U.S. Cl. 156—296                                 9 Claims

ABSTRACT OF THE DISCLOSURE

A fiber-optics image-transmitting device is produced by holding a bundle of substantially straight fibers—each fiber consisting of a core of light-conducting material covered by jacket of transparent material having a lower index of refraction than said core material—at one end and immersing the bundle with the other end entering first into a wetting liquid withdrawing said bundle from the wetting liquid in the longitudinal direction of the axis of the bundle, and after flowing-off of the excess liquid then fixing the ends of said bundle so as to cause the individual fibers at said ends to adhere permanently to each other.

---

The invention relates to a method of producing a fiber-optic image-transmitting device. Such devices are composed of a great number of thin, light-conducting fibers which have to be correctly disposed and bundled as densely as possible so as to achieve a satisfactory image transmission. In order to transmit an optical image by means of such devices as faithfully as possible from one point to another, there must exist a definite, systematic array of the individual fibers between the entrance and the exit side of the bundle. This insures that every element of an optical image which is submitted to the light input face leaves the light output face in its true position so that the image is faithfully transmitted element by element.

The individual fibers of the image-transmitting device consist each of a core made of a material having a high index of refraction and a "jacket" or "cladding" covering this core and made of a transparent material having a lower index of refraction. The material used may be a transparent plastic but, preferably, it is glass. Due to this structural formation of the fibers, the light rays are prevented from passing from one fiber into the adjacent one, so that it is possible to retain the image sharpness and contrast of the transmitted image up to a certain degree. The degree of dissolution of the optical image being transmitted depends much upon the diameter of the individual fibers and the evenness and density with which they are bundled together. The thinner the fibers and the more compact and uniform their arrangement, the better will be the dissolution of the image.

It is the object of the invention to produce a fiber-optic image-transmitting device which consists of a plurality of thin, light-conducting fibers which are compactly and uniformly bundled together.

Fiber-optic image-transmitting devices of the type mentioned are generally desired to be flexible, i.e. only the fiber ends are rigidly mounted. The method according to the invention permits of the production of such flexible image-transmitting devices. However, it also provides for the production of image-transmitting devices in which the fibers are fixed over their entire length, so that the fiber bundle is rigid.

A prior method is known in which a fiber is wound in several layers upon a cylindrical body, much in the way of the coil-winding technique known from the electric art, so that the individual windings contact each other. The windings are then mechanically tied together at several points and subsequently cut between two tying points. Thus a fiber bundle is obtained in which the ends of the fibers are held together and are of the same order both in the light input face and the light output face. Image-transmitting devices of greater dimensions may be produced by superimposing such fiber bundles and then joining the fiber ends together, for example by molding.

This known method has the disadvantage that the fibers are wound under tensile stress, so that very thin fibers cannot be properly arrayed in this manner. Moreover, fiber bundles produced by this winding method still have to be straightened, as the outermost and innermost fibers of the winding are of different lengths depending upon the thickness of the bundle. Consequently, an additional and rather complicated production step is required.

The method according to the invention permits of the bundling of the individual fibers in one operational step in such manner that the entire cross-section of the image-transmitting device is filled at an optimum by fibers. Such an optimal bundling is designated as ideal triangle packing in which each fiber is surrounded by six other closely adjacent fibers, whereby the center points of the cross sections of these fibers form a regular hexagon.

The method of producing a fiber-optic image-transmitting device according to the invention is characterized by the steps of first gathering and tying together at one end a bundle of a plurality of light-conducting fibers, immersing this bundle in a wetting liquid and pulling it out thereof in the fiber direction and subsequently fixing or setting the ends of the bundle.

The novel production method proceeds from a plurality of individual light-conducting fibers cut to the desired length of the image-transmitting device. These fibers are first loosely held together at one end, preferably by means of a loop or a ring which are variable in their diameters. The closed shaped loop or ring prevents a jamming of individual fibers. The mounting should be such that the fiber bundle is loosely held together. Then the fiber bundle is immersed in a wetting liquid, i.e. a liquid having the property of capillary ascension. As such a liquid water may be used advantageously. In the liquid the fibers may move with respect to each other as the liquid displays only little resistance to such a movement and the gravity is reduced. If now the fiber bundle is pulled out of the liquid lengthwise in conformity with the direction of the fibers, the fibers in the bundle will be arranged in the desired orientation, whereby according to a present theory the surface tension contributes substantially to this order. After the liquid has flown off, the bundle exhibits the ideal triangle packing of the individual fibers.

In order to avoid disturbances by air bubbles, it is advisable to carry out the novel method under subpressure. The pressure in such a room should for example amount to slightly more than 15 torr at room temperature.

For facilitating the orderly arrangement of the fibers in the bundle, the use of a liquid with capillary active additives is particularly advantageous. Such additives reduce the surface tension so that the individual fibers may easily move with respect to each other.

It is further advantageous to generate vibrations in the liquid. Thereby the movement of the individual fibers with respect to each other is made easier and thus the establishment of the desired order is further facilitated.

The process of arranging the fibers in the bundle in an orderly pattern is also assisted by producing in the liquid prior to pulling the fiber bundle out of it, a laminar flow in the direction of the fiber axis, whereby it is advantageous to generate a flow which extends also into the spaces between the individual fibers.

It is advantageous to withdraw the fiber bundle from the liquid by moving it through a diaphragm which has an aperture in the form of a regular hexagon the walls of which exert a uniform pressure on the fiber bundle as it is drawn through this diaphragm. Thereby the time for the extra liquid to flow off is reduced. Moreover, by pulling the fiber bundle through the diaphragm, the bundle cross-section assumes the shape of a regular hexagon and this makes it possible to combine later a number of such bundles so as to form a composite bundle with no layers between the component bundles which would interfere with the uniform compact pattern of the composite bundle.

It is of advantage to impart vibrations to the diaphragm through which the fiber bundle is being drawn. If, as mentioned before, vibrations are also generated in the liquid, then the frequency of the vibrations in the liquid may concur with that of the diaphragm; however, the frequencies may also be selected to be different.

To have the liquid run off faster from the bundle and thereby step up the formation of the compact arrangement of the fibers, it is recommended to subject the fiber bundle withdrawn from the liquid at least sectionally to an increased atmospheric pressure. For this purpose, it is of advantage to introduce a pressure gradient along the fiber axis and to apply the higher pressure to the top end of the bundle.

To facilitate further the proper arrangement of the fibers in the bundle, it has been found helpful to introduce the fiber bundle in a pre-oriented condition into the liquid. This pre-sorting is best done as the fiber bundle is being lowered into the liquid by passing it through diaphragms or grids which are disposed in or above the liquid and which subdivide and arrange the fibers of the bundle in strands of small cross-sections. Such grids may be made of fibers or ribbons.

After the bundle has been pulled out of the liquid and the extra liquid has flown off the ends of the bundle are fixed. It is very important to effect this fixing in such a way that there will be no force effecting a possible destruction of the bundle-orientation.

For this purpose it is particularly advantageous to coat the individual fibers with a substance enabling a reversible fixing of contiguous fibers. These coated fibers are then orientated and fixed reversibly and thereafter said substance is first removed at the bundle ends and replaced by a substance effecting a permanent fixing.

With the novel method this coating of the individual fibers is automatically effected when the bundle is immersed in the wetting liquid. If this liquid is water the individual fibers of the fiber bundle are reversibly fixed by lowering the temperature in the bundle area after the bundle has been pulled out of the liquid. Thereby the liquid between the individual fibers freezes and a stiff fiber bundle is produced inside of which the individual fibers cannot move anymore. In the areas of a desired permanent fixing, that is particularly at the bundle ends, said reversible fixing is then removed and replaced by a permanent fixing. For this purpose the bundle ends are dipped into a hardening substance, e.g. casting resin in a space being under subpressure. Thereby the frozen liquid between the fibers is sublimated and is replaced by the hardening substance. It is also possible to employ the principle of freeze-drying and to process further the reversibly fixed bundle in a space being under normal air pressure.

It is also possible to immerse the bundle in a liquid exerting an adhesive effect after drying. In this case, the reversible fixing of the fibers in the bundle is effected by increasing the temperature in the bundle area after the bundle has been pulled out of the liquid. Thereby the solvent of the adhesive evaporates and a stiff fiber bundle is produced. To fix the bundle ends permanently, in this case the adhesive substance is removed chemically and replaced by a hardening substance. A liquid having the required adhesive effect is, for example, alcohol to which a small amount of colophony has been added.

It is also possible to effect the fixing of the bundle ends without fixing it first reversibly. For this purpose the free bundle end is dipped into a hardening substance after the bundle has been pulled out of the liquid. This can be done because the bundle is stiff to a certain degree after flowoff of the extra liquid. After said substance is hard the bundle is turned around, the loop or the ring holding the other end of the bundle together is removed, and the bundle is again immersed in the wetting liquid. After the bundle has been pulled out of this liquid and after the residue of the liquid has flown off, the free bundle end is dipped into the hardening substance and fixed.

After the fixing of the bundle ends is completed, the end faces are ground and polished. It is advantageous to provide the bundle ends also with a reflection-reducing coating.

For the purpose of avoiding stray light, it is helpful to use a curable black substance for the fixing of the bundle ends.

The operational steps just described produce a fiber bundle the ends of which are fixed as desired and in which the fiber cross-sections fill out the bundle cross-section in an optimal manner. Between the ends of the bundle the light-conducting fibers are loose, so that the image-transmitting device is flexible.

If a rigid image-transmitting device is desired, then upon fixing of the bundle ends, the entire fiber bundle may be coated with a hardener.

The invention will be described in further detail with reference to the accompanying drawings which illustrate a few embodiments of devices for practicing the method of the invention.

In the drawings:

FIG. 5 illustrates an elevational view of another device for generating a laminar flow which extends up into the regions between the individual fibers;

FIG. 6 illustrates a perspective view of a device for pre-orienting the fibers in a fiber bundle by passing the bundle through grids arranged in different elevations;

FIG. 7 illustrates in a perspective view a funnel-type diaphragm for pre-orienting the fibers in a fiber bundle;

FIG. 8 illustrates in an elevational view a device in which a reversible fixing of the fiber bundle is accomplished by a reduction of the ambient temperature; and FIG. 9 illustrates a device for the permanent fixing of the ends of a previously oriented fiber bundle.

Figure 1:
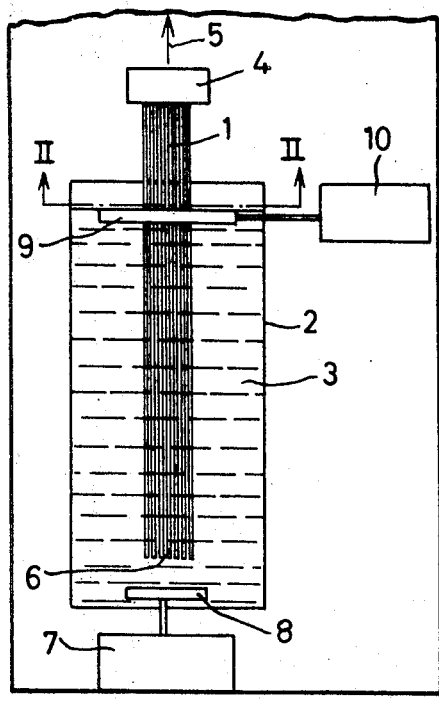
FIG. 1 illustrates an elevational view of a device for producing fiber-optic image-transmitting devices in which vibrations are generated in the liquid in which the bundle of fibers has been immersed.

Referring to FIG. 1 of the drawings, a bundle 1 consisting of a plurality of individual light-conducting fibers is immersed from above in a liquid 3 filled into a container 2. The bundle 1 is loosely held together at its upper end by some holding means 4 such as for instance, a loop or a ring. The entire device is mounted in a receptacle 40 in which a pressure of slightly more than 15 torr at room temperature is maintained.

The bundle 1 is withdrawn upwardly from the liquid 3 in the direction of the arrow 5 and after the liquid has flown off from the bundle, the lower free end 6 of the bundle is fixed. Now the upper holding means 4 is removed and the bundle is reversely immersed in the liquid 3. Again, after withdrawing the bundle 1 from the liquid 3 and flowing off of the liquid from the lower end of the reversed bundle, this second end of the bundle is fixed. It is also possible to fix the fiber bundle 1 illustrated in FIG. 1 in one operational step in that the lower free end of the bundle is fixed and also the upper end which is held together by the holding means 4, namely within a range which exceeds the length of the holding means.

A vibration is generated in the liquid 3 by means of a generator 7 and a plate 8. This vibration may lie in the ultrasonic region.

The fiber bundle 1 is withdrawn from the liquid through a diaphragm 9, which also receives vibrations from the generator 10. The diaphragm 9 may be disposed in the liquid 3, at the surface of this liquid or outside of it.

After the withdrawal of the bundle 1 from the liquid 3, the fibers are optimally arranged, that is, they are arranged in the ideal triangular fashion. Consequently, by using the diaphragm 9, the aperture of which has the shape of a regular hexagon, it is possible to give the bundle cross-section also the shape of a regular hexagon as is illustrated in FIG. 2 and therewith provide a linear configuration of the fiber bundle.

Figure 2:
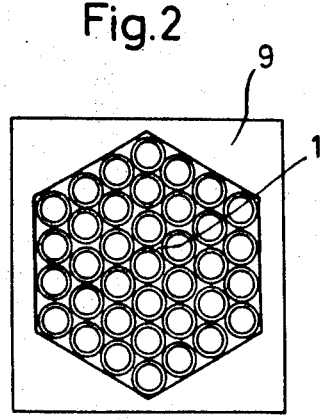
FIG. 2 illustrates a longitudinal sectional view along the line II—II of FIG. 1.
Figure 3:
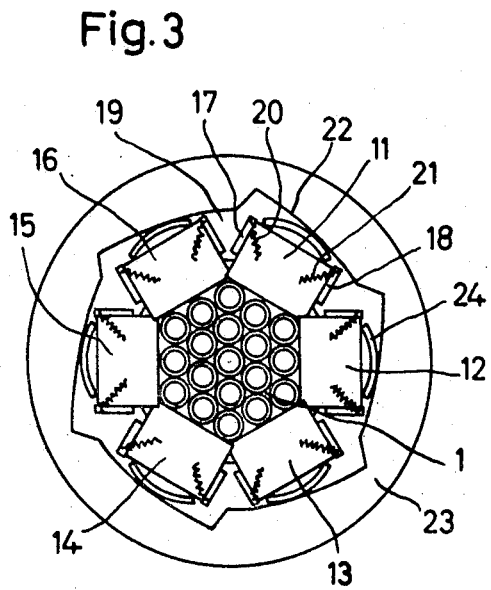
FIG. 3 illustrates a top elevation view of a diaphragm which exerts on all sides a uniform pressure on the fiber bundle.

Instead of the diaphragm 9 illustrated in FIG. 2 there may also be used a diaphragm which exerts a uniform pressure on all sides upon the bundle. Such a diaphragm is illustrated in FIG. 3. It comprises six slidably arranged diaphragm jaws 11, 12, 13, 14, 15 and 16 which form a regular hexagon. The following description of the arrangement of one jaw, namely the jaw 11, applies to all of the diaphragm jaws 11 to 16 in combination with the respective parts. The jaw 11 is movable between guides 17 and 18 which are fixedly mounted on a ring 19 disposed beneath the jaws. A spring 20 attached to the guide 17 and a spring 21 attached to the guide 18 engage the jaw 11 and pull it toward the control cam surface 22 provided in an outer ring 23. The diaphragm jaws are further each resiliently supported by a leaf spring 24 arranged between the jaws 11 to 16 and the cams 22. By rotating the ring 23 with respect to the ring 19 the diaphragm aperture formed by the inner faces of the jaws 11 to 16 is changed and thus can be adapted to bundles of different diameters.

In place of the diaphragm illustrated in FIG. 1, there may further be used a diaphragm having a hexagonal aperture which conically tapers off in the direction of the arrow 5.

Figure 4:
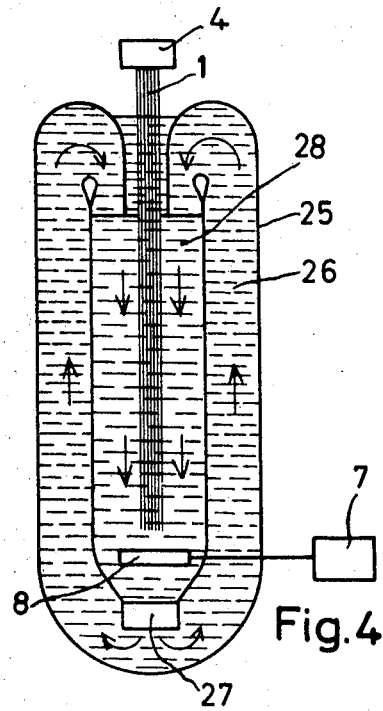
FIG. 4 illustrates diagrammatically in an elevational view a device for producing fiber-optic image-transmitting devices in which a laminar flow along the axial direction of the fibers is produced.

FIG. 4 illustrates an outer container 25 in which the diagrammatically represented circulating device 27 generates a laminar flow of the liquid 26 along the fiber axis. In an inner container 28, the liquid flows in the direction of the fiber bundle 1 as it is inserted into the liquid, this direction being indicated by arrows. This current in the liquid promotes an orderly arrangement of the fibers in the bundle. With 7, 8 is designated a device which produces vibrations in the flowing liquid. After shutting off the circulation device 27, the fiber bundle 1 is withdrawn from the liquid now at rest.

FIG. 5 illustrates a liquid-filled container composed of the superimposed container parts 29, 30 and 31 and into which the fiber bundle 1 is inserted. With 30 is designated a circularly reduced tubular container part which is arranged between the upper part 29 and a lower part 31. The inner diameter of the part 30 is only slightly greater than the diameter of the fiber bundle 1. The circumferential walls of the container parts 29 and 31 are connected with each other by a pipe 41 which has arranged therein a pump 42. This pump 42 pumps the liquid 43 from the lower container part 31 and thereby generates in the container part 30 a laminar flow along the fiber axis. In the illustrated position of the bundle 1 the liquid 43 flows downwardly through the spaces between the individual fibers, this having an orienting effect on the fibers. Prior to withdrawing the bundle 1 from the liquid, the pump 42 is turned off.

FIG. 6 shows a liquid container 32 with a number of vertically spaced horizontal grids 33, 34 and 35 arranged above it. These grids may consist, for instance, or individual fibers arranged as shown in FIG. 6. The particular pattern made by the fibers of each one of the grids 33, 34 and 35 forms small equilateral triangles which effect a preorientation of the fiber bundle passing through the grids in the direction of the arrow 6. The fiber bundle is subdivided by the grids into small cross-sections. To illustrate the arrangement of the grids 33, 34 and 35 more clearly, FIG. 6 shows in each one of the grids a small equilateral triangle 37 which is produced when the grids 33, 34 and 35 are arranged all in one plane. The triangle 37, in turn, is composed of four smaller equilateral triangles, as will be apparent from FIG. 6. The shape of equilateral triangles is selected for the reason that already at the stage of the pre-orientation of the fibers in the bundle, the ideal triangular packing is desired.

The grids 33, 34 and 35 may be disposed above or within the liquid in the container 32.

FIG. 7 illustrates a funnel-shaped diaphragm 38 through which the fiber bundle is passed in the direction of the arrow 39. Also this diaphragm produces a certain preliminary orientation of the fibers in the fiber bundle. It is, however, better to combine the diaphragm 38 with the grids illustrated in FIG. 6.

FIG. 8 illustrates a modified device for practicing the method according to the invention. The fiber bundle 1 composed of individual fibers which are held together at one end by some holding means 45 is immersed in a liquid 46, e.g. water, contained in a container 47 and again is withdrawn from it in the direction of the arrow 50 through a diaphragm 48 surrounding the fiber bundle 1 on all sides. Upon flowing off of the excess liquid from the bundle 1 which is hastened by its pulling through the diaphragm 48, the bundle 1 is moved through a cooled pipe 49. The pipe 49 is cooled by a cooling coil 51.

The temperature in the pipe 49 and the speed with which the fiber bundle is withdrawn from the liquid 46 are so selected that after emergence of the bundle 1 from the pipe 49, the liquid between the fibers is frozen in a layer having at least a thickness of the diameter of a fiber. Thereby a reversible fixing is attained and the result is a rigid fiber bundle.

Subsequently the fiber bundle is placed as shown in FIG. 9 in a container 52 which is connected by a pipe 53 with a vacuum pump. This pump produces in the container 52 a subpressure of, for instance, 0.1 to 1 torr. The container 52 has placed therein another small container 54 filled with a cooled hardening liquid 55.

In the container 52 the frozen liquid between the fibers of the bundle 1 sublimes and is replaced at the lower end of the bundle which is inserted into the container 54 by the hardening liquid 55. After the liquid 55 is completely hardened, the end of the fiber bundle 1 is fixed.

If during the freezing process in the pipe 49, a layer of frozen liquid has been formed at the lower end face of the fiber bundle 1, then it is recommended that after placing the bundle 1 in the container 52, the dipping of the lower end of the bundle into the container 54 is delayed until the frozen liquid in this region has sublimed.

Upon completion of the permanent fixing of the lower free end of the bundle, the mounting 45 is removed and the bundle 1 with this now free end is immersed in the liquid 46. The subsequent steps of withdrawing the bundle, freezing of the liquid and fixing of the bundle end are then repeated in the same manner as described in connection with the first mentioned lower end of the bundle. The result is a satisfactorily oriented fiber bundle with its ends permanently fixed.

It is also possible to carry out the permanent fixing of both ends of the bundle in a single step. For this purpose the free end of the reversibly fixed bundle and a predetermined area next to the holding means 45 on the other end of the bundle are simultaneously placed in a hardening liquid, which preferably is done when the bundle 1 is arranged in a horizontal position.

What we claim is:

1. In a method for producing a fiber optics image-transmitting device including a bundle composed of a plurality of substantially straight light-conducting fibers in which each individual fiber comprises a core of light-conducting material having a high index of refraction which is covered by a jacket of a transparent material having a lower index of refraction, the steps of holding the fibers in said bundle loosely together at one end of said bundle, lengthwise immersing said bundle beginning with the other end thereof in a wetting liquid, generating vibrations in said liquid within the same, withdrawing said bundle from said vibrated wetting liquid in the direction of the longtudinal axis of said bundle through a diaphragm closely surrounding said bundle, and then fixing the ends of said bundle so as to cause the individual fibers to adhere permanently to each other at said ends.

2. A method according to claim 1, in which the fibers in the bundle after the latter has been withdrawn from the liquid are reversibly fixed by changing the temperature in the bundle area, whereupon said reversible fixing at the bundle ends is removed and replaced by a permanent fixing.

3. A method according to claim 1, in which said diaphragm is caused to exert a uniform pressure on all sides of said bundle.

4. A method according to claim 1, in which said diaphragm is caused to vibrate.

5. In a method of producing a fiber-optics image-transmitting device including a bundle composed of a plurality of substantially straight light-conducting fibers in which each individual fiber comprises a core of light-conducting material having a high index of refraction which is covered by a jacket of a transparent material having a lower index of refraction, the steps of holding the fibers in said bundle together at one end of said bundle, lengthwise moving said fiber bundle with the other end foremost first through grids and then immersing it in a wetting liquid, said grids causing said bundle to be subdivided into strands of small cross-section, withdrawing said bundle from said wetting liquid in the direction of the longitudinal axis of said bundle, and then fixing the ends of said bundle so as to cause the individual fibers to adhere permanently to each other at said ends.

6. In a method of producing a fiber-optics image-transmitting device including a bundle composed of a plurality of substantially straight light-conducting fibers in which each individual fiber comprises a core of light-conducting material having a high index of refraction which is covered by a jacket of a transparent material having a lower index of refraction, the steps of holding the fibers in said bundle together at one end of said bundle, lengthwise immersing said bundle beginning with the other end thereof in a wetting liquid, withdrawing said bundle from said wetting liquid in the direction of the longitudinal axis of said bundle, and then reversely fixing the ends of said bundle by reducing the temperature in the bundle area, whereupon each end of the bundle is immersed in a hardening substance in a room in which a subpressure is maintained.

7. In a method of producing a fiber-optics image-transmitting device including a bundle composed of a plurality of substantially straight light-conducting fibers in which each individual fiber comprises a core of light-conducting material having a high index of refraction which is covered by a jacket of a transparent material having a lower index of refraction, the steps of holding the fibers in said bundle together at one end of said bundle, lengthwise immersing said bundle beginning with the other end thereof in a wetting liquid, withdrawing said bundle from said wetting liquid in the direction of the longitudinal axis of said bundle, permitting excess liquid to run off from said bundle, then moving said fiber bundle through a cooling zone and thereupon immersing the ends of said bundle in a hardening substance.

8. In a method for producing a fiber optics image-transmitting device including a bundle composed of a plurality of substantially straight light-conducting fibers in which each individual fiber comprises a core of light-conducting material having a high index of refraction which is covered by a jacket of a transparent material having a lower index of refraction, the steps of holding the fibers in said bundle loosely together at one end of said bundle, lengthwise immersing said bundle beginning with the other end thereof in a wetting liquid, generating vibrations in said liquid within the same, withdrawing said bundle from said vibrated wetting liquid in the direction of the longitudinal axis of said bundle, and then fixing the ends of said bundle so as to cause the individual fibers to adhere permanently to each other at said ends, wherein the improvement comprises that the method is carried out in a room at subpressure.

9. In a method for producing a fiber optics image-transmitting device including a bundle composed of a plurality of substantially straight light-conducting fibers in which each individual fiber comprises a core of light-conducting material having a high index of refraction which is covered by a jacket of a transparent material having a lower index of refraction, the steps of holding the fibers in said bundle loosely together at one end of said bundle, lengthwise immersing said bundle beginning with the other end thereof in a wetting liquid, generating vibrations in said liquid within the same, withdrawing said bundle from said vibrated wetting liquid in the direction of the longitudinal axis of said bundle, and then fixing the ends of said bundle so as to cause the individual fibers to adhere permanently to each other at said ends, wherein the improvement comprises that prior to withdrawing the fiber bundle from said liquid a laminar flow along the entire length of the fiber bundle axis is produced in said liquid.

References Cited

UNITED STATES PATENTS

| | | | |
|---|---|---|---|
| 2,311,704 | 2/1943 | Simison | 156—296X |
| 2,992,956 | 7/1961 | Bazinet | 156—296X |
| 3,148,967 | 9/1964 | Hicks | 156—296X |
| 3,216,807 | 11/1965 | Woodcock | 65—4 |
| 3,255,280 | 6/1966 | Burrowes | 156—296X |
| 3,301,648 | 1/1967 | Sheldon | 350—96X |

BENJAMIN A. BORCHELT, Primary Examiner

R. E. HART, Assistant Examiner

U.S. Cl. X.R.

65—4; 350—96